UNITED STATES PATENT OFFICE.

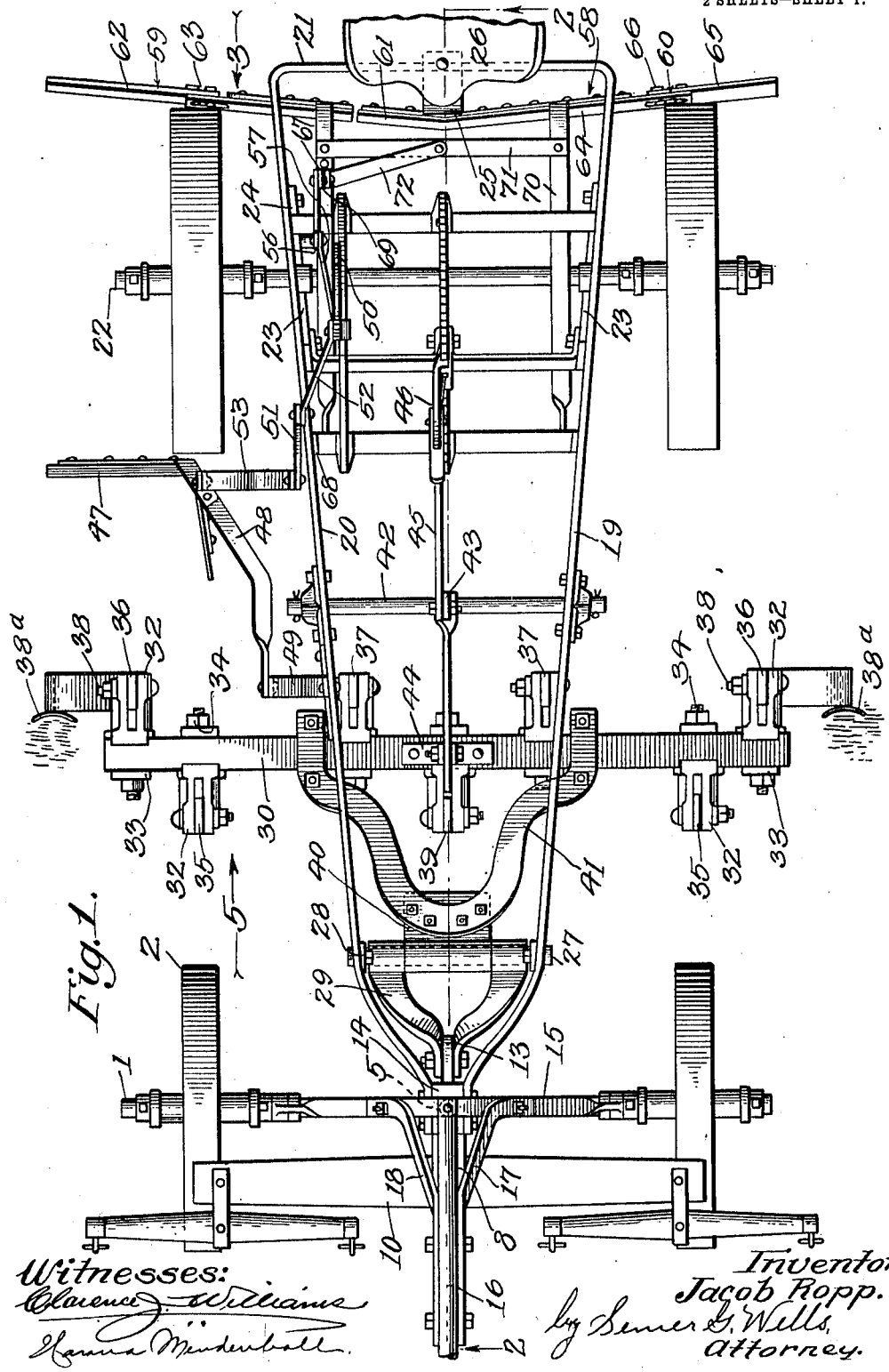

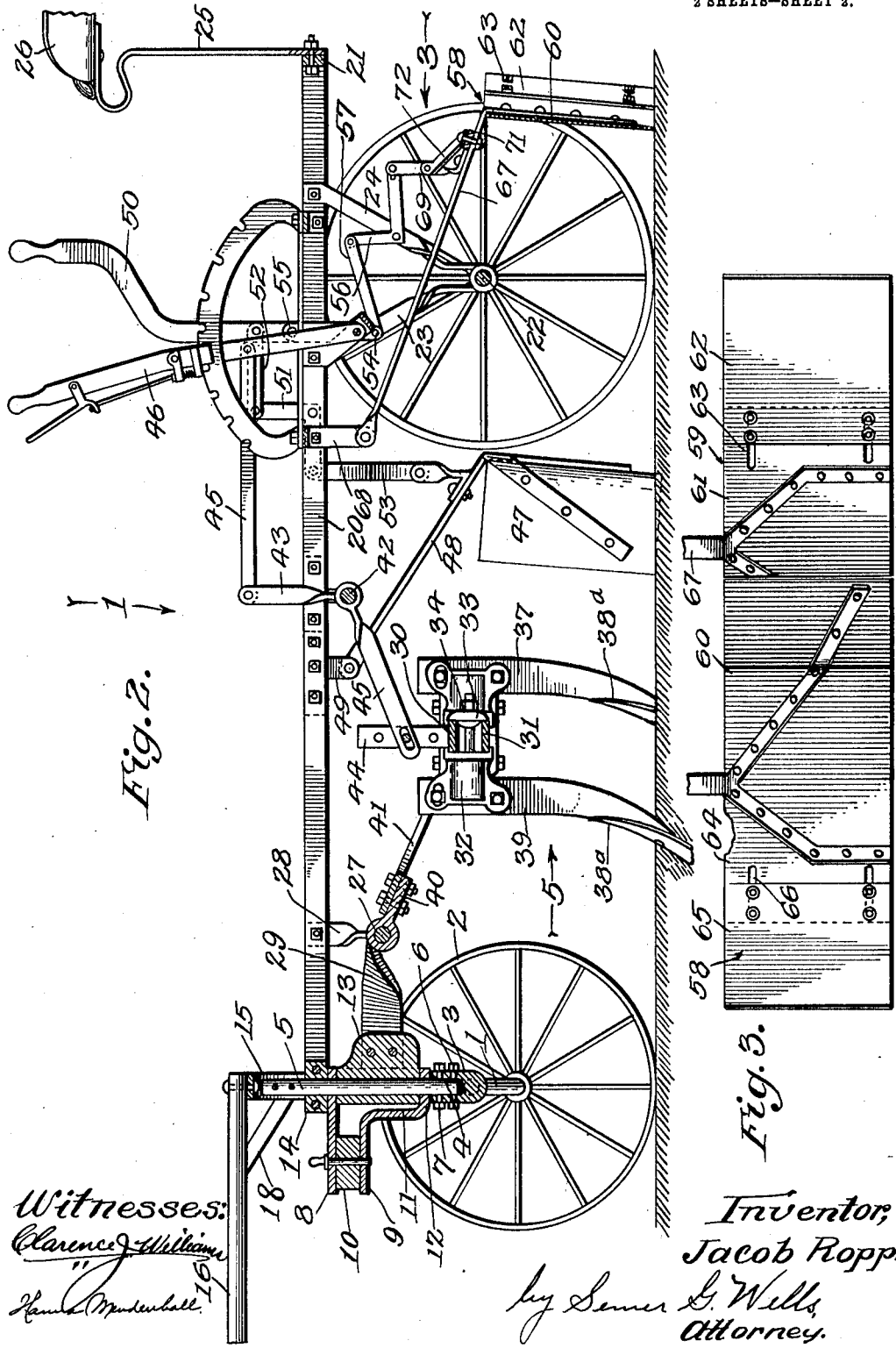

JACOB ROPP, OF SAN DIMAS, CALIFORNIA, ASSIGNOR TO ROPP MANUFACTURING COMPANY, OF GLENDORA, CALIFORNIA.

COMBINATION-CULTIVATOR.

1,019,738. Specification of Letters Patent. Patented Mar. 5, 1912.

Application filed November 14, 1910. Serial No. 592,244.

*To all whom it may concern:*

Be it known that I, JACOB ROPP, a citizen of the United States, residing at San Dimas, California, have invented a new and useful Combination-Cultivator, of which the following is a specification.

My object is to construct a combination cultivator to be used in cultivating and irrigating orange groves and the like; and my invention consists of the novel features herein shown, described and claimed.

In the drawings: Figure 1 is a top plan view of a combination cultivator embodying the principles of my invention. Fig. 2 is a vertical, longitudinal sectional detail on the line 2—2 of Fig. 1. Fig. 3 is a rear elevation of the scrapers as seen looking in the direction indicated by the arrows 3 in Figs. 1 and 2.

Referring to the drawings the details are as follows: The front axle 1 is arched up in the center and has traction wheels 2 upon its ends. A bearing block 3 is rigid with the center of the axle and extends upwardly therefrom, there being a slot 4 extending downwardly into the bearing block and longitudinally of the axle. The king bolt 5 extends downwardly into the slot 4 and is pivotally mounted therein by one of the bolts 6 or 7 extending through the bearing block and through the king bolt. If it is desired to make the king bolt rigid with the axle the two bolts 6 and 7 are employed, and if it is desired to produce a rocker motion only one of the bolts is employed.

The clevis for the double-tree consists of a straight plate 8 and a plate 9 having a straight portion to fit under the doubletree 10 and having a central portion 11 extending downwardly parallel with the king bolt 5 and having a rear lower portion 12 fitting upon the king bolt 5 and resting upon the bearing block 3. A bearing block 13 is mounted upon the king bolt 5, between the rear ends of the parts 8 and 12. A third bearing block 14 fits upon the king bolt 5 on top of the clevis plate 8.

An arched bar 15 is attached to the ends of the axle 1, just inside of the traction wheels 2, and extends over the upper end of the king bolt 5. The tongue 16 is attached to the center of the arched bar 15 and braces 17 and 18 are attached to the tongue and to the arched bar to hold the tongue rigid with the axle. The main frame is preferably a single piece of heavy iron bar, said bar being rectangular in cross section and set edge-wise, and comprises the side pieces 19 and 20, the rear end piece 21 connecting the rear ends of the side pieces, the forward ends of the side pieces 19 and 20 being connected to the bearing block 14.

The rear axle 22 is connected to the rear end of the frame by the braces 23 and 24, said braces being of considerable height so as to hold the frame level. The seat post 25 is attached to the center of the rear end 21 and the seat 26 is mounted upon the upper end of the post. The pivot shaft 27 is connected to the sides 19 and 20 by braces 28 and is connected to the bearing block 13 by braces 29.

The frame carrying the cultivator shovels consists of two bars 30 and 31, said bars being rectangular in cross section and placed flat-wise, one above the other, and some distance apart. The cultivator holders 32 are placed against the edges of the bars 30 and 31; clamping plates 33 are placed against the opposite edges and bolts 34 are inserted through the holders and through the clamping plates, between the bars 30 and 31; so as to clamp the bars 30 and 31 rigidly together and so as to hold the cultivator holders 32 rigidly in place.

The cultivator shanks are made in sets of three, 35, 36 and 37, and said shanks are mounted in the cultivator holders 32 and secured in place by bolts 38. The shanks 37 are straight, the shanks 35 are straight and considerably longer than the shanks 37 and the shanks 36 are curved outwardly and downwardly. Cultivator shovels 38$^a$ are carried upon the lower ends of the shanks 35, 36 and 37. The shovels upon the shanks 35 are directly in line behind the wheels 2 and are intended to extend downwardly into the furrows for the purpose of getting under the crust in the bottom of the furrows and sub-soiling, as shown in Fig. 5.

The shanks 36 are curved outwardly so as to reach out beyond the lines of the traction wheels 2, under the trees, and the shovels upon the shanks 36 and 37 are intended to operate in the banks upon the sides of the furrows and to throw the earth into the furrows behind the sub-soiling shovels, upon the shanks 35. When desired a central cultivator shank 39, carrying a cultivator shovel, may be employed. A hinge plate 40 is mounted upon the shaft 27, between the braces 28, and an A-shaped frame 41 is attached at its ends to the bars 30 and at its center to the hinge plate 40; so as to mount the cultivator shovels to swing up and down.

A pivot shaft 42 is mounted cross-wise below the side pieces 19 and 20 and a bell crank lever 43 is mounted upon the shaft, one end of the lever extending forwardly and downwardly, and is connected to a bracket 44, upon the center of the cultivator bars 30, and the other end of the lever extending upwardly is connected by a link 45 to the rack and hand lever 46; so that by manipulating the hand lever 46 the cultivators may be raised or lowered.

The scraper 47 is mounted directly in front of the right hand rear wheel, said scraper being angle shaped in plan and extending some distance outwardly from the wheel. An arm 48 extends upwardly and inwardly from the scraper 47 and is pivotally connected to the bracket 49, upon the side piece 20. A hand lever 50 is pivotally mounted upon the side piece 20. A bell crank lever 51 is mounted some distance in front of the hand lever, the upper end of the bell crank lever being connected to the hand lever by a link 52, and the lower end of the bell crank lever being connected to the bar 48 by a link 53; so that the scraper 47 may be raised or lowered by manipulating the hand lever 50.

An arm 54 extends downwardly from the hand lever 50, below the pivot 55. A bell crank lever 56 is pivotally attached to a brace 24 and a link 57 connects one end of the bell crank lever to the lower end of the arm 54, the other end of the bell crank lever being connected to the scraper 58; so that the scraper 58 will be raised and lowered simultaneously with the scraper 47. The scraper 58 is constructed in two independent parts, 59 and 60, the part 59 comprising plates 61 and 62, adjustably connected together by slots and bolts 63, and the part 60 comprising the plate 64 and a plate 65 adjustably connected together by the slots and bolts 66.

An arm 67 extends upwardly and forwardly from the part 59 and is pivotally connected to a hanger 68 extending downwardly from the side piece 20 and a brace 69 extends upwardly from the rear end of the arm 67 and the bell crank lever 56 is attached to this brace; so that when the hand lever 50 is operated the part 59 will be raised or lowered and said part 59 travels directly behind the right hind rear wheel and behind the scraper 47. An arm 70 extends upwardly and forwardly from the part 60 and is pivotally attached to a hanger similar to the hanger 68. A brace 71 rigidly connects the rear ends of the arms 67 and 70 and a brace 72 connects the central portion of the brace 71 to the brace 69; so as to frame the two parts 59 and 60 together; so that when they are framed together the whole scraper 58 is moved up and down by manipulating the hand lever 50.

In one operation of furrowing the entire scraper 58 is used and in another operation the braces 72 and 71 are disconnected and the part 60 is tied up to the frame out of use.

It is obvious that many changes may be made in the details of construction without departing from the spirit of my invention.

In a companion application for irrigating machine, filed June 20, 1911, Ser. No. 634,363, I have claimed the two scrapers running in a single furrow and I do not wish to make such claims in this application.

I claim:

1. In a combination cultivator for irrigating, a furrowing apparatus for making two furrows, an angled scraper mounted behind the apparatus for making one furrow, and a second scraper mounted behind the first scraper and extending the width of the two furrows.

2. In a combination cultivator for irrigating, a furrowing apparatus for making two furrows, a scraper mounted behind the furrow apparatus and extending the width of the two furrows, and means for operating the scraper up and down intermittently, said scraper being adapted for cutting a trench cross-wise from one furrow to the other and damming the furrows on one side of the trench.

JACOB ROPP.

Witnesses:
HANNA MENDENHALL,
ANDREW K. MARTELL.

Copies of this patent may be obtained for five cents each, by addressing the "Commissioner of Patents, Washington, D. C."